(12) United States Patent
Rheker

(10) Patent No.: US 8,721,764 B2
(45) Date of Patent: May 13, 2014

(54) METHOD FOR OPERATING A FURNACE AND DEVICE FOR CARRYING OUT THE METHOD

(75) Inventor: Frank Rheker, Dusseldorf (DE)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 308 days.

(21) Appl. No.: 13/061,428

(22) PCT Filed: Aug. 28, 2009

(86) PCT No.: PCT/EP2009/006249
§ 371 (c)(1),
(2), (4) Date: Feb. 28, 2011

(87) PCT Pub. No.: WO2010/022964
PCT Pub. Date: Mar. 4, 2010

(65) Prior Publication Data
US 2011/0154949 A1    Jun. 30, 2011

(30) Foreign Application Priority Data
Aug. 29, 2008    (EP) .................................. 08163347

(51) Int. Cl.
*C22B 21/00*    (2006.01)
(52) U.S. Cl.
CPC ..................................... *C22B 21/00* (2013.01)
USPC ............................................ 75/381; 75/385
(58) Field of Classification Search
CPC ..................................................... C22B 21/00
USPC .................................................. 75/381, 385
See application file for complete search history.

(56) References Cited

U.S. PATENT DOCUMENTS 6,247,416 B1    6/2001  Beaudoin et al.
7,462,218 B2 *  12/2008  Ducrocq ........................ 75/385

FOREIGN PATENT DOCUMENTS

EP          0553632       8/1993
WO     WO 2004 027332    4/2004

OTHER PUBLICATIONS

International Search Report for PCT/EP2009/006249, mailed Oct. 29, 2009.

*Primary Examiner* — Jie Yang
(74) *Attorney, Agent, or Firm* — Christopher J. Cronin

(57) ABSTRACT

The invention relates to a method for operating a furnace, wherein a starting material comprising at least one metal element is molten, wherein the starting material is heated by at least one burner that is operated with a fuel volume flow of a fuel and an oxidant volume flow of an oxidant. An exhaust gas temperature of the furnace is monitored in an exhaust gas line at least at one measuring point downstream of a post combustion zone, wherein in a standard operational state a target fuel volume stream and a target oxidant volume stream is fed to the burner, wherein a change of the exhaust gas temperature is recorded at predetermined time frequencies and is compared to a predetermined threshold value. The invention is characterized in that when the change of the exhaust gas temperature per time unit is greater than the threshold value, the burner is put into a reduced operational state for a predetermined time, wherein the quotient of fuel volume stream to oxidant volume stream is lowered by at least one of the following actions: A) a predetermined sudden reduction of the fuel volume stream to a reduced volume stream and B) a predetermined sudden increase of the oxidant volume stream to an increased volume stream, said quotient being reset to the standard operating state after the reduction period.

13 Claims, 3 Drawing Sheets

METHOD FOR OPERATING A FURNACE AND DEVICE FOR CARRYING OUT THE METHOD

CROSS-REFERENCE TO RELATED APPLICATIONS

This application is a §371 of International PCT Application PCT/EP2009/006249, filed Aug. 28, 2009, which claims §119(a) foreign priority to European patent application 08163347.1, filed Aug. 29, 2008.

BACKGROUND

1. Field of the Invention

The present invention relates to a method and a device for operating a furnace, in particular a furnace for melting metal, for example scrap iron.

2. Related Art

The melting of metals is one of the energy-intensive processes in which large amounts of energy have to be used in order to achieve the desired outcome. Corresponding methods for operating a furnace are known, for example, from U.S. Pat. No. 6,247,416. Owing to the greatly increasing costs of energy and the debate about carbon dioxide emissions, it is desirable to make the melting process of melting metals more energy-efficient.

SUMMARY OF THE INVENTION

On the basis of this, it is an object of the invention to provide a method for operating a furnace, in which the energy demand to be satisfied is reduced. It is also an object to provide a corresponding device for carrying out the method.

The objects are achieved by the features of the independent claims. The dependent claims relate to advantageous refinements.

The method according to the invention for operating a furnace, wherein a starting material comprising at least one metallic element is melted by heating the starting material using at least one burner, which is operated with a fuel volume flow rate of a fuel and an oxidant volume flow rate of an oxidant, wherein an exhaust gas temperature of the furnace is monitored in an exhaust gas line at least at one measuring point downstream of a postcombustion zone, wherein in a standard operating state a setpoint fuel volume flow rate and a setpoint oxidant volume flow rate are delivered to the burner, wherein a change of the exhaust gas temperature is recorded at predeterminable time intervals and compared with a predeterminable limit value, is distinguished in that whenever the change of the exhaust gas temperature per unit time is greater than the limit value, the burner is put for a predeterminable reduction time into a reduced operating state, in which the ratio of the fuel volume flow rate to the oxidant volume flow rate is lowered by at least one of the following measures:
A) a predeterminable abrupt reduction of the fuel volume flow rate to a reduced volume flow rate and
B) a predeterminable abrupt increase of the oxidant volume flow rate to an increased volume flow rate and is put back into the standard operating state after the reduction time has elapsed.

An abrupt increase or reduction of a volume flow rate is intended to mean an immediate change of the volume flow rate by at least 3%, preferably by at least 5%. An abrupt change is thus a discontinuous change in the manner of a jump. The change of the exhaust gas temperature is monitored by monitoring the exhaust gas temperature at a measurement point. The change of the exhaust gas temperature can be determined by comparing the recorded exhaust gas temperatures. The burner is preferably configured so that during operation, the flame of the burner touches the starting material and/or sweeps over and/or around it. The starting material conventionally comprises a metal to be melted and optionally additives, for example coal and/or additives or compounds containing carbon. A postcombustion zone is intended to mean a region in which postcombustion of the exhaust gases can take place after they leave the furnace. In particular, such a postcombustion zone lies downstream of a means for supplying air downstream of the furnace, which may in particular be formed as an air gap.

The metal to be melted may for example comprise scrap iron, or aluminum. Further additives in the starting material are also formed by impurities or by components due to the consistency of the items to be melted. For example, beverage cans to be melted have impurities in the form of paint or residual contents. For example, motors to be melted have impurities in the form of a lubricant or transmission oil. Many industrial materials to be melted have plastic parts, components and/or coatings.

During operation of the furnace, operating states occur in which a larger amount of carbon or material containing carbon is suddenly available for oxidation. This is the case for example, if, when melting metal in a rotation furnace with the addition of coal and/or additives containing carbon, for example coke and/or graphite or plastic components, larger amounts of coal or carbon come in contact with the corresponding oxidant during rotation of the rotation furnace. When melting beverage cans, for example, or other coated or painted metal objects, oxidation of the corresponding coating or paint takes place upon contact with the oxidizing agent or when reaching the corresponding flame point of the corresponding coating or the paint. Such conditions, owing to the fuel volume flow rate and the oxidant volume flow rate, lead to a situation in which a relatively large amount of carbon monoxide is formed. This will be referred to below as carbon monoxide release. This carbon monoxide can be oxidized to carbon dioxide upon further contact with the oxidant. This process is exothermic. This carbon monoxide release and the subsequent oxidation of the carbon monoxide to carbon dioxide leads to a significant rapid rise in the temperature of the exhaust gas, since ambient air is often supplied in the exhaust gas in order to cool the exhaust gas, if the operating conditions of the furnace are not thereupon changed or are changed only slightly. This is the case, for example, when the fuel supply, i.e. the fuel volume flow rate or the oxidant volume flow rate, is changed only slightly in small steps. A strong rise in the exhaust gas temperature, for example by 300° C. or more, then occurs when coming in contact with fresh air as so-called postcombustion. This is a temperature rise which is essentially not available for melting the starting material, since it occurs in the exhaust gas system. However, the temperature rise leads to greater stress on the exhaust gas system, in particular refractory cladding thereof.

According to the present invention, the strong temperature rise in the exhaust gas, which occurs with a carbon monoxide release, is detected and a predeterminable abrupt reduction of the fuel volume flow rate to a reduced volume flow rate is subsequently carried out immediately. This reduced volume flow rate differs considerably from the setpoint fuel volume flow rate, for example by 10% or more. An abrupt reduction of the fuel supply therefore takes place, while the oxidant volume flow rate is kept constant. Since the carbon monoxide continues to be oxidized, a significant reduction of the exhaust gas temperature takes place in comparison with the situation with an essentially constant fuel volume flow rate, although it is still high owing to the oxidation of the carbon monoxide release. In this way, the material of the exhaust gas line is thermally stressed less and therefore has longer service lives.

As an alternative or in addition, the oxidant volume flow rate may be increased abruptly to a predeterminable increased volume flow rate. In this way, the oxidation of the carbon monoxide release already takes place in a controlled way in the furnace, so that a high melting power can be achieved. This makes the melting process more effective.

In principle, reducing the ratio of the fuel volume flow rate to the oxidant volume flow rate in an abrupt manner leads to more effective process management, possibly with less stress on the furnace material.

In particular, organic compounds such as hydrocarbon, for example natural gas, may be used as the fuel.

According to an advantageous configuration of the method according to the invention, the limit value is selected so that the limit value is greater than usual measurement value variations at least by a factor of two, preferably at least three.

Here, usual measurement value variations are intended to mean the usual spread of the experimentally determined temperature values, as well as a slight temperature change not attributable to a carbon monoxide release. The effect achievable by the factor of at least two between the limit value and the usual measurement value variations is that unintended and unnecessary operation in the reduced operating state can be avoided.

According to another advantageous configuration of the method according to the invention, the limit value is selected so that it corresponds to the edge of a temperature rise due to carbon monoxide release in the furnace.

This means that the limit value is selected so that a change in the operating state of the furnace from the standard operating state to the reduced operating state takes place only when there are significant temperature rises.

According to another advantageous configuration, the limit value is at least 4 kelvin/s.

A configuration in which the limit value is at least 10 kelvin/sec. is particularly preferred. These strong rapid rises in the temperature can in practice be attributed exclusively to carbon monoxide releases. Usual temperature rises due to the heating cycle and the measurement value variations are much less. Setting the limit value at least at 5 kelvin/sec, and in particular at least 10 kelvin/sec or even at least 20 kelvin/sec, is consequently advantageous since reliable detection of the carbon monoxide release can be ensured in this way.

According to another advantageous configuration of the method according to the invention, the reduction time is selected so that it corresponds to the duration of a temperature rise due to carbon monoxide release in the furnace.

Both the duration and the level of the temperature rise due to carbon monoxide release are known or measurable, since these furnaces are conventionally operated with particular compositions of starting materials, i.e. for example particular amounts of scrap iron and particular amounts of added coal. On the basis of this, this knowledge can be used in order to establish both the limit value and the reduction time and/or the reduced volume flow rate and/or the increased volume flow rate. As a function of the furnace, this leads to an optimal reduction of the energy input required, or a corresponding increase in the furnace efficiency.

According to another advantageous configuration of the method according to the invention, the reduction time is at least 20 sec.

Usual carbon monoxide releases cause temperature rises, so-called peaks, which are at least 20 sec. long. On the basis of this, a reduction of the energy input can particularly advantageously be achieved by setting the reduction time to at least 20 sec.

According to another advantageous configuration of the method according to the invention, the reduced volume flow rate is dimensioned so that the difference between the setpoint fuel volume flow rate and the reduced volume flow rate, multiplied by the reduction time, corresponds to a fuel volume whose calorific value corresponds to the average calorific value of carbon monoxide release in the furnace. As an alternative or in addition, the increased volume flow rate may be dimensioned so that complete oxidation of the carbon monoxide release can take place.

A calorific value is intended to mean the amount of energy which is thermally released in the corresponding process. It is, for example, known that an amount of energy equal to about 3.5 kWh (kilowatt hours) is released by the oxidation of 1 $m^3$ of carbon monoxide to carbon dioxide. Since the exhaust gas volume is usually known or can be determined by an exhaust gas analysis, and the usual carbon monoxide concentration in the exhaust gas is known or can be determined, it is thus possible to calculate how much carbon monoxide is converted into carbon dioxide during a carbon monoxide release. The extent to which the fuel input should be reduced can then be calculated from this. This is achieved by reduction of the fuel volume flow rate and by the reduction time. As an alternative or in addition, the increased volume flow rate may be dimensioned so that complete oxidation of the carbon monoxide release can take place.

According to another advantageous configuration of the method according to the invention, the ratio of the reduced volume flow rate and the setpoint fuel volume flow rate lies in the range of from 0.3 to 0.9 and/or the ratio of the setpoint oxidant volume flow rate and the increased volume flow rate lies in the range of from 0.3 to 0.9. These ratios advantageously allow corresponding exploitation of the thermal energy of the oxidation of the carbon monoxide release into carbon dioxide. It should again be pointed out that an abrupt reduction of the fuel volume flow rate and/or increase of the oxidant volume flow rate takes place at the changeover from the setpoint operating state to the reduced operating state. A reduction of the fuel volume flow rate and/or an increase of the oxidant volume flow rate by from 10 to 50% is preferred.

According to another advantageous configuration of the method according to the invention, the oxidant comprises at least one of the following substances:
a) air and
b) oxygen.

It is thus possible to use pure oxygen or ambient air as the oxidant, as well as mixtures thereof. An oxidant in which the proportion of oxygen is up to 100% is preferred.

According to another advantageous configuration of the method according to the invention, the increased volume flow rate is dimensioned so that it is sufficient for complete oxidation of a usual carbon monoxide release.

With known operating conditions, the carbon monoxide concentrations in carbon monoxide releases are usually also known or can be measured, so that it is possible to adjust the increased volume flow rate with a known reduction time.

According to another advantageous configuration, the starting material comprises carbon.

In this case, the carbon may be present either in compounds such as a paint, or oil, grease, for example as lubricant oil, transmission oil when melting motors or the like, or in pure form, for example in the form of anthracite coal.

According to another advantageous configuration of the method according to the invention, the starting material comprises at least one of the following metallic elements:
a) iron;
b) aluminum;
c) manganese;
d) tin;
e) zinc; and
f) lead.

The elements may occur in compounds, particularly when recycling industrial items such as for example motors, batteries or solder tin. The method according to the invention can be used particularly advantageously for melting scrap iron. In this case, owing to the large amount of energy then required because of the high melting point, a great energy saving can be achieved by the method according to the invention.

According to another advantageous configuration of the method according to the invention, the furnace is a furnace of one of the following types:
a) a rotation furnace;
b) a cupola furnace;
c) a rotary furnace;
d) a tilting furnace;
e) a melting/casting furnace; and
f) a tank furnace.

In particular, the use of the method according to the invention for operating a rotation furnace is advantageous since carbon monoxide releases often occur owing to the constant mixing of the starting material in the furnace during the rotation. In a cupola furnace, carbon monoxide release takes place for example when the starting material falls in the cupola furnace after a coal layer has been burnt through.

According to another advantageous configuration of the method according to the invention, at least one of the following quantities is varied continuously as a function of the temperature change in the normal operating state:
a) the setpoint fuel volume flow rate and
b) the setpoint oxidant volume flow rate.

This consequently applies to situations in which the change of the temperature lies below the limit value. In such operating states, a variation in particular of the setpoint fuel volume flow rate takes place by very small values, rather than abruptly to the reduced volume flow rate. The setpoint fuel volume flow rate and/or the setpoint oxidant volume flow rate can therefore be adapted continuously rather than abruptly.

Another aspect of the present invention provides a device for carrying out the method according to the invention, comprising a control means which is suitable and intended to carry out the method according to the invention, and a temperature sensor for recording the temperature of the exhaust gas of the furnace.

In a preferred configuration of the device according to the invention, an exhaust gas line is formed with an angled-off section, and the temperature sensor is formed downstream of the angled-off section.

The angled-off section of the exhaust gas line will prevent parts of the starting material, for example sizeable scrap sections, from being able to reach the temperature sensor and damage it. As an alternative or in addition, the exhaust gas line may also have a section with a slope, in which case the temperature sensor is preferably formed in a region which is raised in comparison with the furnace outlet, so as to achieve protection of the temperature sensor.

BRIEF DESCRIPTION OF THE FIGURES

The details and advantages disclosed for the method according to the invention may be applied and adapted to the device according to the invention, and vice versa. The invention will be explained in more detail below with the aid of the appended drawing, without being restricted to the details and exemplary embodiments presented therein.

They schematically show.

DETAILED DESCRIPTION OF THE INVENTION

Figure 1:
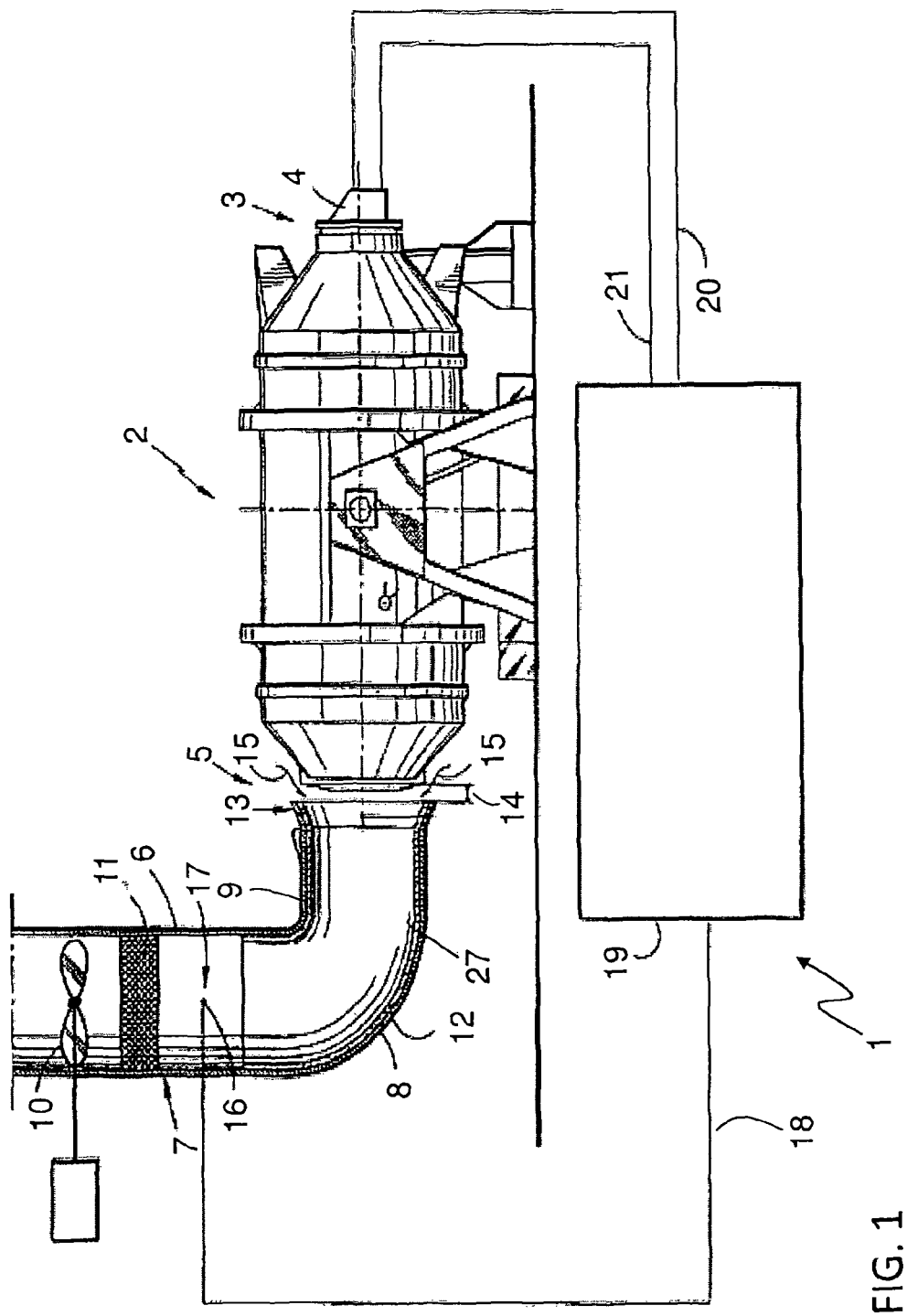
FIG. 1: a furnace which can be operated by the method according to the invention.

FIG. 1 schematically shows an exemplary embodiment of the device 1 according to the invention for operating a furnace 2. The furnace 2 is a rotation furnace in which a starting material comprising at least one metallic element, for example scrap iron with additives, for example coal, is melted. The furnace 2 comprises an inlet 3 with a burner 4. An oxidant, for example oxygen, air or oxygen-enriched air, and a fuel, for example natural gas, are introduced into the furnace 2 through the burner 4. The furnace 2 furthermore comprises an outlet 5, through which the exhaust gases of the combustion and oxidation processes in the furnace 2 are transferred into an exhaust gas line 6. The exhaust gas line 6 comprises an angled-off section 7, which is connected via a curved section 8 to a straight section 9. By means of a suction device 10, the exhaust gas can be extracted from the furnace 2 through the exhaust gas line 6. Filter means 11, which induce filtering and/or at least partial chemical reaction of the exhaust gas, may in this case be formed in the exhaust gas line 6. In particular the curved section 8 of the exhaust gas line 6 and the interior of the furnace 2 (not shown here) are clad with a refractory material 12, in order to achieve endurance against the high temperatures of the exhaust gas, the metal melt and the slag being formed.

The inlet region 13 of the straight section 9 is widened, its inner diameter being larger than the corresponding outlet 5 of the furnace 2. The inlet region 13 is furthermore formed with a spacing 14 from the outlet 5 of the furnace 2. By means of this spacing 14, which acts as an air gap, ambient air 15 can be added to the exhaust gas so that the latter is cooled. The incoming ambient air 15 can cause the oxidation of carbon monoxide to carbon dioxide, so that the spacing 14 acts as an air supply means. This oxidation of carbon monoxide to carbon dioxide is referred to as postcombustion. It can take place in the postcombustion zone 27, when the appropriate reaction conditions exist.

The device 1 comprises a temperature sensor 16 for determining the temperature of the exhaust gas of the furnace 2. This temperature sensor 16 is formed at a measurement point 17 in the exhaust gas line, specifically downstream of a postcombustion zone 27 in the angled-off section 7 of the exhaust gas line 6, that is to say downstream of the curved section 8. The temperature measurement sensor 16 is connected via a data line 18 to a control means 19. In the control means 19, the fuel volume flow rate is controlled by means of a fuel line 20 and the oxidant volume flow rate is controlled by means of an oxidant line 21, which lead to the burner 4. The control means 19 records the temperature of the exhaust gas at the measurement point 17. This temperature is recorded at predeterminable time intervals, the recorded temperature values are compared with one another and the change of the temperature as a function of time is calculated. The measurement point 17 is formed downstream of the postcombustion zone 27 of the exhaust gas line 6, in which postcombustion can take place when the appropriate reaction conditions exist, in particular when the exhaust gas contains carbon monoxide that can react with atmospheric oxygen, which can enter through a spacing 14 which forms an air gap.

If the change of the temperature exceeds a predeterminable limit value, for example 5° C./sec., then the furnace 2 is put into a reduced operating state. This means that the fuel volume flow rate is lowered abruptly from a setpoint fuel volume flow rate to a reduced volume flow rate, that is to say the reduced volume flow rate is at least 5% less than the setpoint fuel volume flow rate, preferably even at least 10% less than the setpoint fuel volume flow rate. The reduced operating state is maintained for a predeterminable reduction time. During this reduction time, no further changes are made to the fuel volume flow rate, which remains constant.

The duration and the difference between the setpoint fuel volume flow rate and the reduced volume flow rate are dimensioned so that they correspond to a reduced fuel supply with a calorific value of the order of magnitude of that which a carbon monoxide release in the furnace 2 contributes to the energy introduced into the furnace. It is not necessary to increase the oxidant volume flow rate, since the direct consumption of the oxidant is decreased owing to the reduced fuel supply and the oxidizing agent still available, for example oxygen, can be used for oxidizing the carbon monoxide to carbon dioxide. The thermal energy thereby produced is used for further heating of the starting material in the furnace 2.

The carbon monoxide releases occur whenever larger amounts of material containing carbon, for example coal, come in contact with a sufficiently large amount of oxidant and/or reach a corresponding flame temperature. In a rotation furnace, for example, this may be the case whenever scrap iron is melted with coal, for example anthracite coal, and larger batches of coal come in contact with the oxidant during the rotation of the furnace 2. Carbon monoxide release then occurs from carbon which has not been thoroughly oxidized. This carbon monoxide release is further oxidized into carbon dioxide by contact with oxidant at a correspondingly high temperature. This process is exothermic. If the fuel supply is not reduced, a strong rise in the temperature of the exhaust gas takes place, often by more than several hundred ° C., for example by 350° C. or more. This heating of the exhaust gas and consequently also of the starting material in the furnace, as well as of the furnace, is undesirable since it is not necessary for melting the starting material and entails a high thermal stress on the furnace and in particular its inner wall and the exhaust gas line 6. This temperature rise is now significantly reduced by the process management according to the invention. This leads on the one hand to a considerable energy saving by saving on fuel, and on the other hand to a much lower thermal stress on the furnace 2 and the exhaust gas line 6. The filter means 11 is also exposed to less thermal stress.

Figure 2:
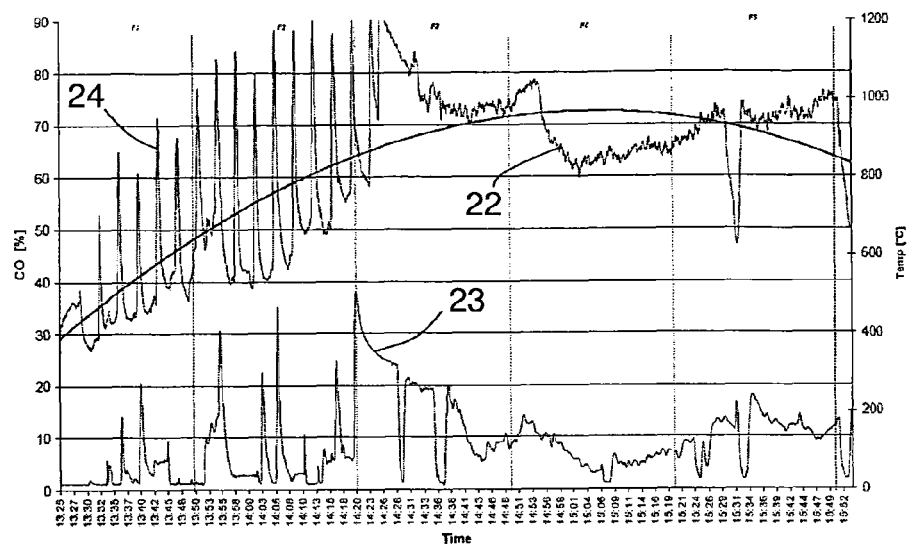
FIG. 2: a profile of the temperature and the carbon monoxide content without using the method according to the invention.

FIG. 2 shows an experimentally determined temperature profile 22 of the exhaust gas temperature and an experimentally determined carbon monoxide profile 23 of the carbon monoxide content in the exhaust gas of a rotation furnace. It can be seen that whenever the carbon monoxide profile curve 23 rises, the temperature profile curve 22 also rises. Carbon monoxide release 24 refers to a corresponding peak in the carbon monoxide profile 23. Experimental measurements have revealed that a corresponding peak in the carbon monoxide profile corresponds almost simultaneously to a corresponding peak in the corresponding temperature profile 22.

Figure 3:
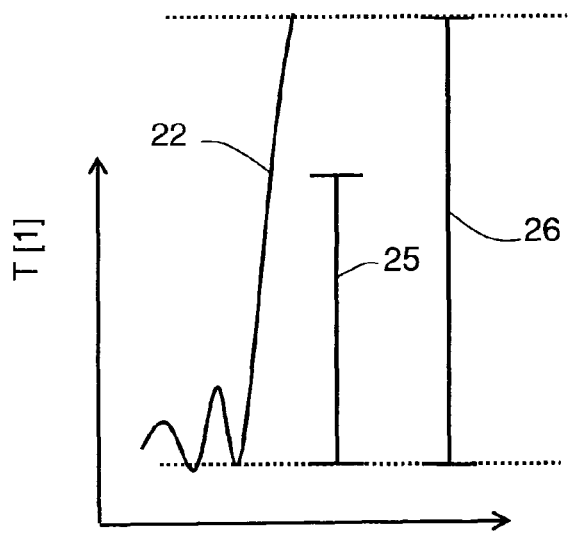
FIG. 3: a detail of the temperature profile without using the method according to the invention.

FIG. 3 schematically shows a detail of the temperature profile 22 of FIG. 2. The temperature profile 22 shows a steep rise. By comparison with the predeterminable limit value 25, it is found that the change 26 of the temperature is more than the predeterminable limit value 25. In this case, the furnace 2 is changed from the standard operating state to the reduced operating state, if it is not already in the reduced operating state. After the predetermined reduction time has elapsed, the furnace 2 is again operated in the standard operating state.

Figure 4:
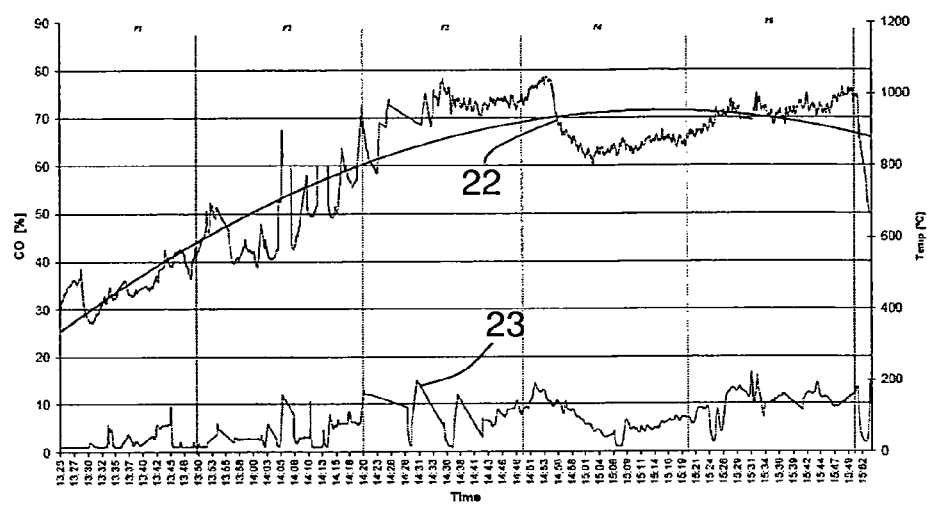
FIG. 4: a detail of the temperature profile when using the method according to the invention.

FIG. 4 shows a corresponding temperature profile 22 in the exhaust gas when using the method according to the invention. The carbon monoxide releases lead to a greatly reduced temperature rise, and the thermal energy of the oxidation of the carbon monoxide to carbon dioxide is utilized better. The carbon monoxide profile 23 in the exhaust gas shows much lower peaks.

The method according to the invention and the device according to the invention advantageously make it possible to operate the furnace 2 for melting e.g. scrap iron with a high energy saving potential in comparison with methods known from the prior art, since in this case an abrupt and significant reduction of the fuel volume flow rate takes place when a large change of the temperature occurs, which is attributable to the release and further reaction of a significant amount of carbon monoxide. The heat produced by the combustion of carbon monoxide to carbon dioxide can thus be used for further heating of the starting material. Furthermore, the thermal stresses on the furnace 2 and the exhaust gas line 6 are advantageously reduced and the service life of these equipment components is increased.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

LIST OF REFERENCES

1 device for operating a furnace
2 furnace
3 inlet
4 burner
5 outlet
6 exhaust gas line
7 angled-off section
8 curved section
9 straight section
10 suction device
11 filter means
12 refractory material
13 inlet region
14 spacing
15 ambient air
16 temperature measurement sensor
17 measurement point
18 data line
19 control means
20 fuel line
21 oxidant line
22 temperature profile
23 carbon monoxide profile
24 carbon monoxide release
25 limit value
26 temperature change
27 postcombustion zone

The invention claimed is:

1. A method for operating a furnace, wherein a starting material comprising at least one metallic element is melted by heating the starting material using at least one burner, which is operated with a fuel volume flow rate of a fuel and an oxidant volume flow rate of an oxidant, wherein an exhaust gas temperature of the furnace is monitored in an exhaust gas line at least at one measuring point downstream of a postcombustion zone, wherein in a standard operating state a setpoint fuel volume flow rate and a setpoint oxidant volume flow rate are delivered to the burner, wherein a change of the exhaust gas temperature is recorded at predeterminable time intervals and compared with a predeterminable limit value, characterized in that whenever the change of the exhaust gas temperature per unit time is greater than the limit value, the burner is put for a predeterminable reduction time into a reduced operating state, in which the ratio of the fuel volume flow rate to the oxidant volume flow rate is lowered by at least one of the following measures:
   A) a predeterminable abrupt reduction of the fuel volume flow rate to a reduced volume flow rate and
   B) a predeterminable abrupt increase of the oxidant volume flow rate to an increased volume flow rate
and is put back into the standard operating state after the reduction time has elapsed.

2. The method of claim 1, wherein the limit value is selected so that it is greater than usual measurement value variations at least by a factor of two.

3. The method of claim 1, wherein the limit value is selected so that it corresponds to the edge of a temperature rise due to carbon monoxide release in the furnace.

4. The method of claim 1, wherein the limit value is at least 4 K/s.

5. The method of claim 1, wherein the reduction time is selected so that it corresponds to the duration of a temperature rise due to carbon monoxide release in the furnace.

6. The method of claim 1, wherein the reduction time is at least 20 seconds.

7. The method of claim 1, wherein the reduced volume flow rate is dimensioned so that the difference between the setpoint fuel volume flow rate and the reduced volume flow rate, multiplied by the reduction time, corresponds to a fuel volume whose calorific value corresponds to the average calorific value of carbon monoxide release in the furnace.

8. The method of claim 1, wherein a ratio of the reduced volume flow rate and the setpoint fuel volume flow rate and/or the ratio of the setpoint oxidant volume flow rate and the increased volume flow rate lies in the range of from 0.3 to 0.9.

9. The method of claim 1, wherein the increased volume flow rate is dimensioned so that it is sufficient for complete oxidation of a usual carbon monoxide release.

10. The method of claim 1, wherein the starting material comprises carbon.

11. The method of claim 1, wherein the starting material comprises at least one of the following metallic elements:
   a) iron;
   b) aluminum;
   c) manganese;
   d) tin;
   e) zinc; and
   f) lead.

12. The method of claim 1, wherein the furnace is a furnace of one of the following types:
   a) a rotation furnace;
   b) a cupola furnace;
   c) a rotary furnace;
   d) a tilting furnace;
   e) a melting/casting furnace; and
   f) a tank furnace.

13. The method of claim 1, wherein at least one of the following quantities is varied continuously as a function of the temperature change in the normal operating state:
   a) the setpoint fuel volume flow rate and
   b) the setpoint oxidant volume flow rate.

* * * * *